US012605907B2

(12) United States Patent
Tatsushima

(10) Patent No.: US 12,605,907 B2
(45) Date of Patent: Apr. 21, 2026

(54) FILAMENT WINDING DEVICE AND FILAMENT WINDING METHOD

(71) Applicant: HONDA MOTOR CO., LTD., Tokyo (JP)

(72) Inventor: Kosuke Tatsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 18/391,953

(22) Filed: Dec. 21, 2023

(65) Prior Publication Data

US 2024/0208160 A1 Jun. 27, 2024

(30) Foreign Application Priority Data

Dec. 27, 2022 (JP) ................................. 2022-209141

(51) Int. Cl.
*B29C 70/38* (2006.01)
*B29C 70/20* (2006.01)
*B29L 31/00* (2006.01)

(52) U.S. Cl.
CPC .......... *B29C 70/384* (2013.01); *B29C 70/205* (2013.01); *B29C 70/386* (2013.01); *B29L 2031/7156* (2013.01)

(58) Field of Classification Search
CPC ............................ B29C 70/384; B29C 70/386
See application file for complete search history.

(56) References Cited

U.S. PATENT DOCUMENTS

| | | | | | |
|---|---|---|---|---|---|
| 3,112,234 | A | * | 11/1963 | Krupp ..................... | B29C 53/60 |
| | | | | | 156/169 |
| 3,145,429 | A | * | 8/1964 | Resor ..................... | D02G 1/127 |
| | | | | | 19/66 T |
| 4,790,898 | A | * | 12/1988 | Woods ..................... | B29C 70/20 |
| | | | | | 156/441 |
| 4,822,444 | A | * | 4/1989 | Weingart ............. | B29C 53/566 |
| | | | | | 156/441 |
| 2020/0283256 | A1 | * | 9/2020 | Noji ........................ | B29C 70/32 |
| 2021/0215293 | A1 | | 7/2021 | Inoue | |

FOREIGN PATENT DOCUMENTS

| | | | | | |
|---|---|---|---|---|---|
| CN | 101404970 | B | * | 12/2012 | ......... A61F 13/3523 |
| JP | 2007-276193 | A | | 10/2007 | |
| JP | 2011-093276 | A | | 5/2011 | |
| JP | 2011-111709 | A | * | 6/2011 | |
| JP | 2017-209902 | A | | 11/2017 | |
| JP | 2020-128010 | A | | 8/2020 | |
| JP | 2020-142468 | A | | 9/2020 | |

(Continued)

OTHER PUBLICATIONS

CN-101404970 translation (2012).*

(Continued)

*Primary Examiner* — Philip C Tucker
(74) *Attorney, Agent, or Firm* — Carrier, Shende & Associates P.C.; Joseph P. Carrier; Fulchand P. Shende

(57) ABSTRACT
A band-shaped bundle is conveyed to a workpiece by a roller row in a filament winding device and a filament winding method. During the conveyance of the band-shaped bundle by the roller row, a width of the band-shaped bundle is adjusted. The band-shaped bundle is wound around the workpiece adjacently in a widthwise direction of the band-shaped bundle.

10 Claims, 8 Drawing Sheets

(56)                    References Cited

FOREIGN PATENT DOCUMENTS

| JP | 2021-014856 A | 2/2021 |
| JP | 2021-109357 A | 8/2021 |
| JP | 2021-109427 A | 8/2021 |
| JP | 2022-030873 A | 2/2022 |

OTHER PUBLICATIONS

Office Action dated Aug. 5, 2025 issued in the corresponding Japanese Patent Application No. 2022-209141 with the English machine translation thereof.

* cited by examiner

COMPARATIVE EXAMPLE

EMBODIMENT

FILAMENT WINDING DEVICE AND FILAMENT WINDING METHOD

CROSS-REFERENCE TO RELATED APPLICATIONS

This application is based upon and claims the benefit of priority from Japanese Patent Application No. 2022-209141 filed on Dec. 27, 2022, the contents of which are incorporated herein by reference.

BACKGROUND OF THE INVENTION

Field of the Invention

The present invention relates to a filament winding device and a filament winding method.

Description of the Related Art

JP 2007-276193 A discloses a filament winding device (FW device) for winding a fiber bundle, which is a bundle of a plurality of fibers, around a workpiece. In the FW device, a plurality of fiber bundles are aligned in a row in the widthwise direction of the fiber bundles to form one band-shaped fiber bundle (band-shaped bundle). The band-shaped bundle is wound around the workpiece.

SUMMARY OF THE INVENTION

The FW device winds the band-shaped bundle around the workpiece while partially overlapping the adjacent parts of band-shaped bundle with each other so that no gap is formed between the adjacent parts of the band-shaped bundle on the surface of the workpiece. When the parts of band-shaped bundles partially overlap each other, unevenness is generated on the surface of the workpiece. When the band-shaped bundle is further wound around the surface of the workpiece, the band-shaped bundle is wound along the unevenness, so that the surface of the workpiece becomes uneven and the band-shaped bundle meanders. As a result, the mechanical strength of the manufactured product may not be secured.

The present invention has the object of solving the aforementioned problem.

A filament winding device according to a first aspect of the present invention is configured to wind a band-shaped bundle, which is a bundle of a plurality of fibers, around a workpiece. The filament winding device includes a roller row configured to convey the band-shaped bundle to the workpiece, and a width adjustment mechanism configured to adjust a width of the band-shaped bundle during conveyance by the roller row in a manner so that the band-shaped bundle is wound around the workpiece adjacently in a widthwise direction of the band-shaped bundle.

A filament winding method according to a second aspect of the present invention is a method of winding a band-shaped bundle, which is a bundle of a plurality of fibers, around a workpiece. The filament winding method includes conveying the band-shaped bundle to the workpiece by a roller row, as a first step, adjusting a width of the band-shaped bundle during conveyance of the band-shaped bundle by the roller row, as a second step, and winding the band-shaped bundle around the workpiece adjacently in a widthwise direction of the band-shaped bundle, as a third step.

According to the present invention, by adjusting the width of the band-shaped bundle, the band-shaped bundle can be wound adjacently around the workpiece. This suppresses the occurrence of unevenness on the surface of the workpiece, and prevents the band-shaped bundle from being wound on the unevenness. As a result, the mechanical strength of the product, which is a workpiece wound with the band-shaped bundle, can be improved.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
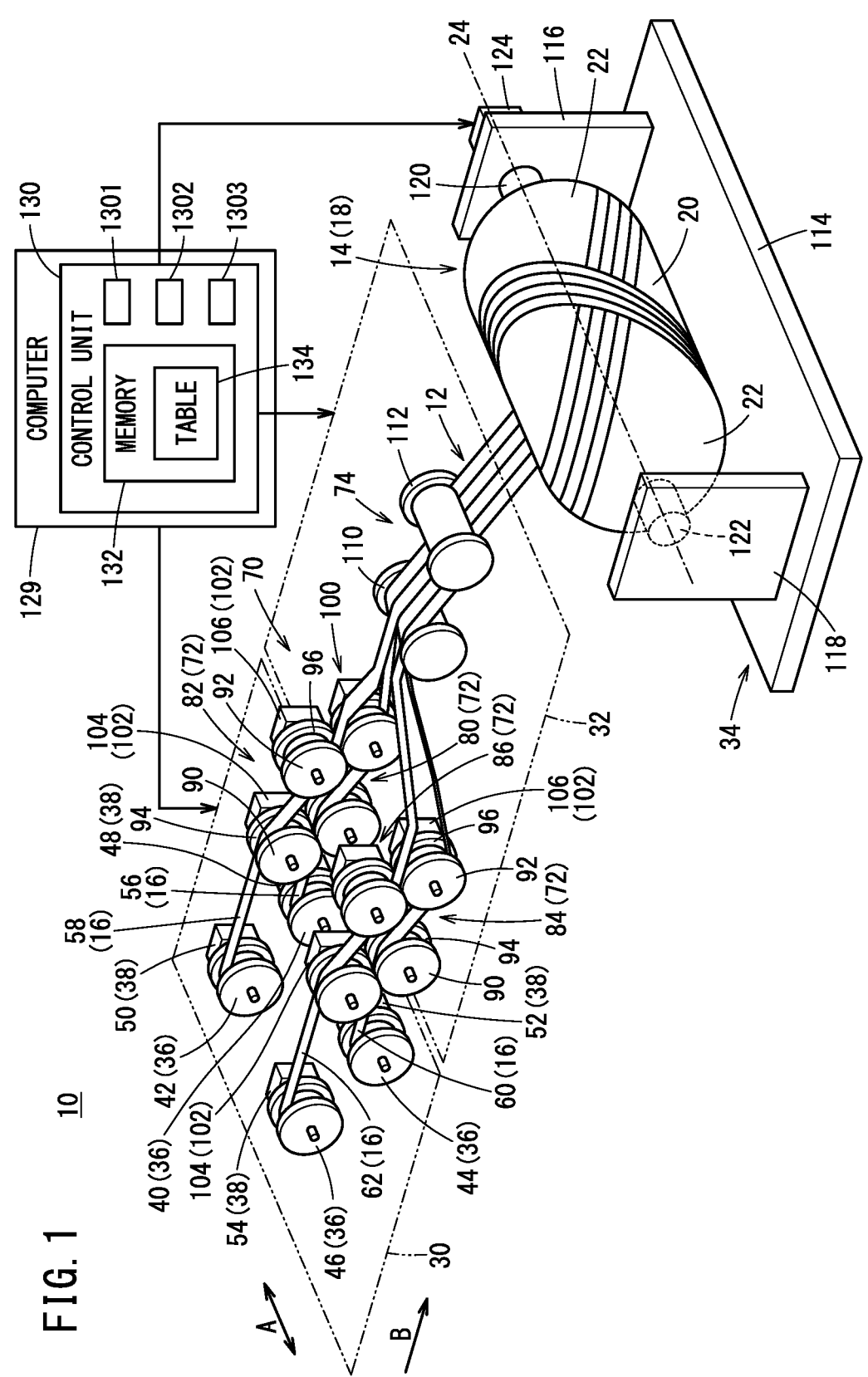
FIG. 1 is a perspective view of an FW device.

FIG. 1 is a perspective view of a filament winding device 10 according to the present embodiment. In the following description, the filament winding device 10 may be sometimes referred to as an FW device 10.

The FW device 10 produces a product such as a high pressure tank (not shown) by winding a band-shaped bundle 12, which is a bundle of a plurality of fibers (not shown), around a workpiece 14. The band-shaped bundle 12 is formed by arranging fiber bundles 16, each of which is formed by bundling a plurality of fibers, in a row in a widthwise direction of the band-shaped bundle 12 (the direction of arrow A).

The fiber bundle 16 is formed by bundling a large number of fibers. The fibers forming the fiber bundle 16 are, for example, carbon fibers or glass fibers. The fiber bundle 16 is previously impregnated with a resin. The resin with which the fiber bundle 16 is impregnated, for example, is epoxy resin which is a thermosetting resin. Accordingly, the fiber bundle 16 is so-called tow prepreg.

Figure 2:
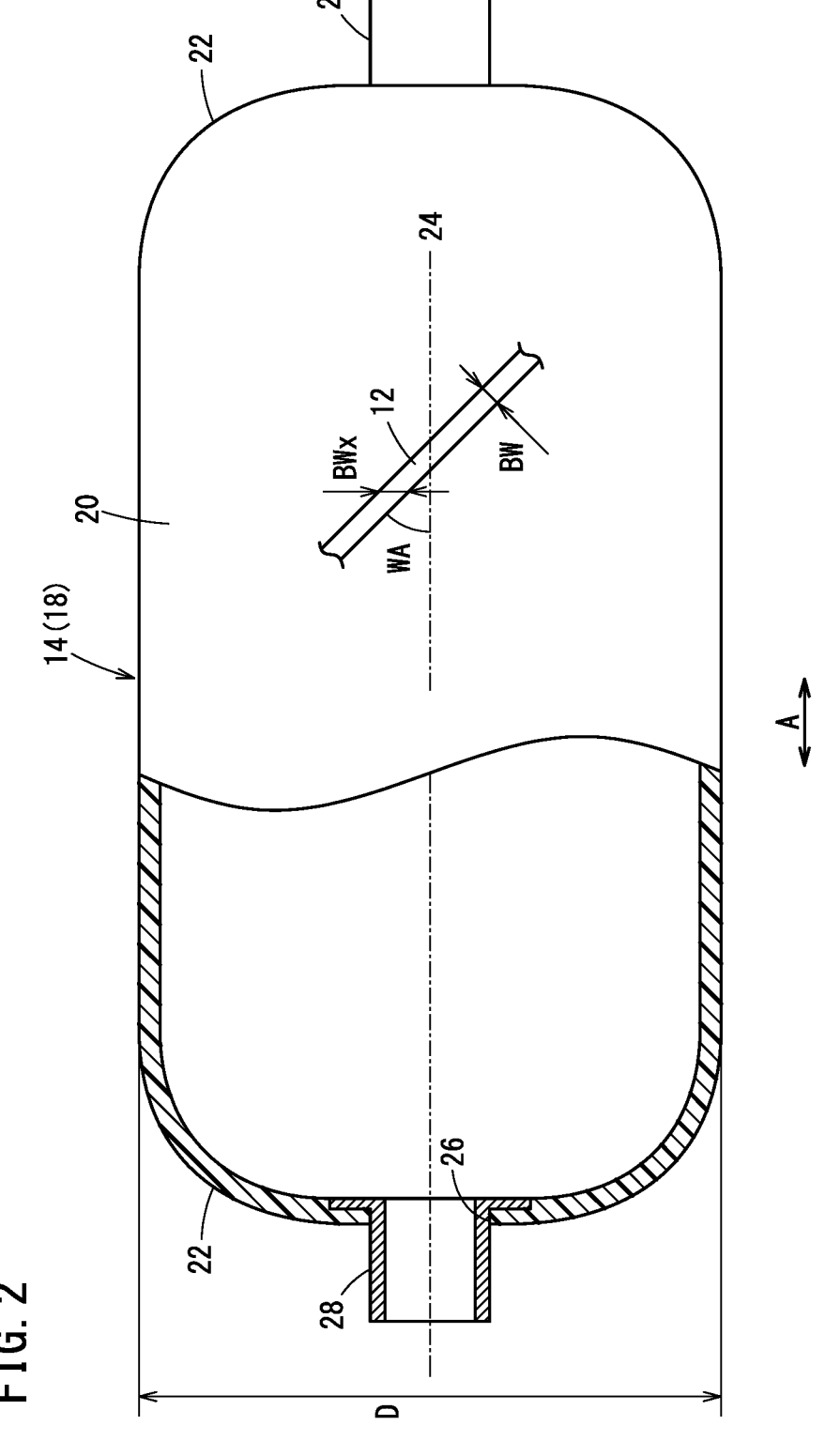
FIG. 2 is a side view of a workpiece.

As shown in FIG. 2, the workpiece 14 is a liner 18 made of resin or metal. By winding the band-shaped bundle 12 on the surface of the liner 18, a fiber reinforced resin layer 19 (fiber layer) (see FIG. 6B) is formed on the surface of the liner 18.

Specifically, the liner 18 has a round tubular shaped cylinder portion 20 and dome portions 22 provided at both ends of the cylinder portion 20. The two dome portions 22 are formed with openings 26 coaxial with an axis 24 (central axis) of the liner 18, respectively. A tubular cap 28 is attached to each of the two openings 26. As shown in FIG. 1, the direction of the axis 24 of the liner 18 and the widthwise direction of the band-shaped bundle 12 are both the direction of arrow A.

The FW device 10 forms a helical layer on the surface of the workpiece 14 by winding the band-shaped bundle 12 adjacently on the surfaces of the two dome portions 22 by way of helical winding, so as to be provided on the surface of the cylinder portion 20. Further, the FW device 10 forms a hoop layer on a surface of the portion of the helical layer that is formed on the cylinder portion 20, by winding the band-shaped bundle 12 by way of hoop winding. As a result, the fiber reinforced resin layer 19 is formed on the surface of the workpiece 14. The term "wind adjacently" includes both a case where the band-shaped bundle 12 is wound on the surfaces of the two dome portions 22 without a gap between one part and another part of the wound band-shaped bundle 12 and a case where the band-shaped bundle 12 is wound on the surfaces of the two dome portions 22 with a slight gap between one part and another part of the wound band-shaped bundle 12.

As shown in FIG. 1, the FW device 10 includes a fiber bundle delivery unit 30, a delivery head 32, and a liner support unit 34. In the FW device 10, the fiber bundle delivery unit 30 and the delivery head 32 are arranged in this order along the direction of arrow B toward the workpiece 14. The direction of arrow B is also a conveyance direction of the plurality of fiber bundles 16 and the band-shaped bundle 12.

The fiber bundle delivery unit 30 feeds out the plurality of fiber bundles 16 and delivers them to the delivery head 32. Specifically, the fiber bundle delivery unit 30 includes a plurality of bobbins 36 and a plurality of bobbin drive units 38. Each of the plurality of bobbins 36 has the same configuration. Each of the plurality of bobbin drive units 38 has the same configuration.

A fiber bundle 16, which is a roving, is wound around each of the plurality of bobbins 36 in advance. The central axis of each of the plurality of bobbins 36 is along the direction of arrow A. The bobbin drive unit 38 is connected to each of the plurality of bobbins 36 in the direction of arrow A. Each of the plurality of bobbin drive units 38 is a motor or the like. Each of the plurality of bobbin drive units 38 drives the bobbin 36 to rotate, thereby feeding out the fiber bundle 16 from the bobbin 36.

In FIG. 1, four bobbins 36 and four bobbin drive units 38 are provided in the fiber bundle delivery unit 30. The plurality of bobbins 36 include first bobbins 40 to fourth bobbins 46. The plurality of bobbin drive units 38 include first bobbin drive units 48 to fourth bobbin drive units 54. The first bobbin drive unit 48 drives the first bobbin 40 to rotate. The second bobbin drive unit 50 drives the second bobbin 42 to rotate. The third bobbin drive unit 52 drives the third bobbin 44 to rotate. The fourth bobbin drive unit 54 drives the fourth bobbin 46 to rotate.

In the fiber bundle delivery unit 30, the first bobbin 40 and the first bobbin drive unit 48 are disposed below the second bobbin 42 and the second bobbin drive unit 50. Therefore, the second bobbin 42 and the second bobbin drive unit 50 are disposed above the first bobbin 40 and the first bobbin drive unit 48. The third bobbin 44 and the third bobbin drive unit 52 are disposed below the first bobbin 40 and the first bobbin drive unit 48 with a space therebetween in the direction of arrow A. The fourth bobbin 46 and the fourth bobbin drive unit 54 are disposed above the third bobbin 44 and the third bobbin drive unit 52.

In the following description, the fiber bundle 16 drawn out from the first bobbin 40 is referred to as a first fiber bundle 56. The fiber bundle 16 drawn out from the second bobbin 42 is referred to as a second fiber bundle 58. The fiber bundle 16 drawn out from the third bobbin 44 is referred to as a third fiber bundle 60. The fiber bundle 16 drawn out from the fourth bobbin 46 is referred to as a fourth fiber bundle 62. The first fiber bundle 56 to the fourth fiber bundle 62 are also collectively referred to as fiber bundles 16. The fiber bundle 16 wound around each bobbin 36 and the fiber bundle 16 after being fed out from each bobbin 36 are referred to as fiber bundles 16 as long as they are bundles of a plurality of fibers.

As described above, the first bobbin 40 to the fourth bobbin 46 are disposed in the fiber bundle delivery unit 30 in a state where they are spaced apart from each other. Therefore, the first fiber bundle 56 to the fourth fiber bundle 62 are supplied to the delivery head 32 in a state where they are spaced apart from each other.

The delivery head 32 forms the band-shaped bundle 12, which is one band-shaped fiber bundle (band), by collecting the first fiber bundle 56 to the fourth fiber bundle 62 supplied from the fiber bundle delivery unit 30. The delivery head 32 supplies the formed single band-shaped bundle 12 to the liner 18.

The delivery head 32 has a plurality of roller rows 70. The plurality of roller rows 70 has a plurality of width adjustment rollers 72 and a plurality of assembly rollers 74. The plurality of width adjustment rollers 72 are disposed upstream of the delivery head 32 in the direction of arrow B. A plurality of assembly rollers 74 are disposed between the plurality of width adjustment rollers 72 and the workpiece 14 in the delivery head 32.

The plurality of width adjustment rollers 72 are disposed with spacing. Each of the plurality of width adjustment rollers 72 conveys one of the plurality of fiber bundles 16 conveyed from the fiber bundle delivery unit 30 toward the plurality of assembly rollers 74.

As shown in FIG. 1, the plurality of width adjustment rollers 72 include first width adjustment roller 80 to fourth width adjustment roller 86. The first width adjustment roller 80 to the fourth width adjustment roller 86 are disposed with spacing from each other.

The first width adjustment roller 80 is disposed below the delivery head 32. The first width adjustment roller 80 conveys the first fiber bundle 56 conveyed from the fiber bundle delivery unit 30 toward the plurality of assembly rollers 74. The second width adjustment roller 82 is disposed above the first width adjustment roller 80. The second width adjustment roller 82 conveys the second fiber bundle 58 conveyed from the fiber bundle delivery unit 30 toward the plurality of assembly rollers 74. The third width adjustment roller 84 is disposed below the first width adjustment roller 80 with a space therebetween in the direction of arrow A. The third width adjustment roller 84 conveys the third fiber bundle 60 conveyed from the fiber bundle delivery unit 30 toward the plurality of assembly rollers 74. The fourth width adjustment roller 86 is disposed above the third width adjustment roller 84. The fourth width adjustment roller 86 conveys the fourth fiber bundle 62 conveyed from the fiber bundle delivery unit 30 toward the plurality of assembly rollers 74.

Each of the first width adjustment roller 80 to the fourth width adjustment roller 86 has a first roller 90 and a second roller 92. The first roller 90 and the second roller 92 have the same shape. The central axes of the first roller 90 and the second roller 92 are aligned in the direction of arrow A. A first guide groove 94 having an annular shape is formed in the outer peripheral portion of the first roller 90 (see FIGS. 3 and 4). The second roller 92 is disposed between the first roller 90 and the plurality of assembly rollers 74. A second guide groove 96 having an annular shape is formed in the outer peripheral portion of the second roller 92. The plurality of fiber bundles 16 are respectively passed over the first guide groove 94 of the first roller 90 and the second guide groove 96 of the second roller 92.

The delivery head 32 has a width adjustment mechanism 100. The width adjustment mechanism 100 is configured by a plurality of width adjustment rollers 72 and a plurality of roller movement units 102. The plurality of roller movement units 102 move at least one of the first roller 90 or the second roller 92 in the axial direction (the direction of arrow A) of each of the plurality of width adjustment rollers 72.

Specifically, each of the plurality of roller movement units 102 has a first roller movement unit 104 and a second roller movement unit 106. The first roller movement unit 104 is an actuator or the like connected to the first roller 90 in the direction of arrow A. The first roller movement unit 104 moves the first roller 90 in the direction of arrow A. The second roller movement unit 106 is an actuator or the like connected to the second roller 92 in the direction of arrow A. The second roller movement unit 106 moves the second roller 92 in the direction of arrow A.

The width adjustment mechanism 100 adjusts the width BW of the band-shaped bundle 12 while the band-shaped bundle 12 is being conveyed by the plurality of roller rows 70 so that the band-shaped bundle 12 is wound adjacently around the workpiece 14 in the direction of arrow A. The width adjustment mechanism 100 adjusts the width of the band-shaped bundle 12 by adjusting the widths of the fiber bundles 16 by the plurality of width adjustment rollers 72. Specifically, the plurality of roller movement units 102 move at least one of the width adjustment rollers 72 with respect to each of the plurality of width adjustment rollers 72, thereby adjusting the width of the plurality of fiber bundles 16.

Figure 3:
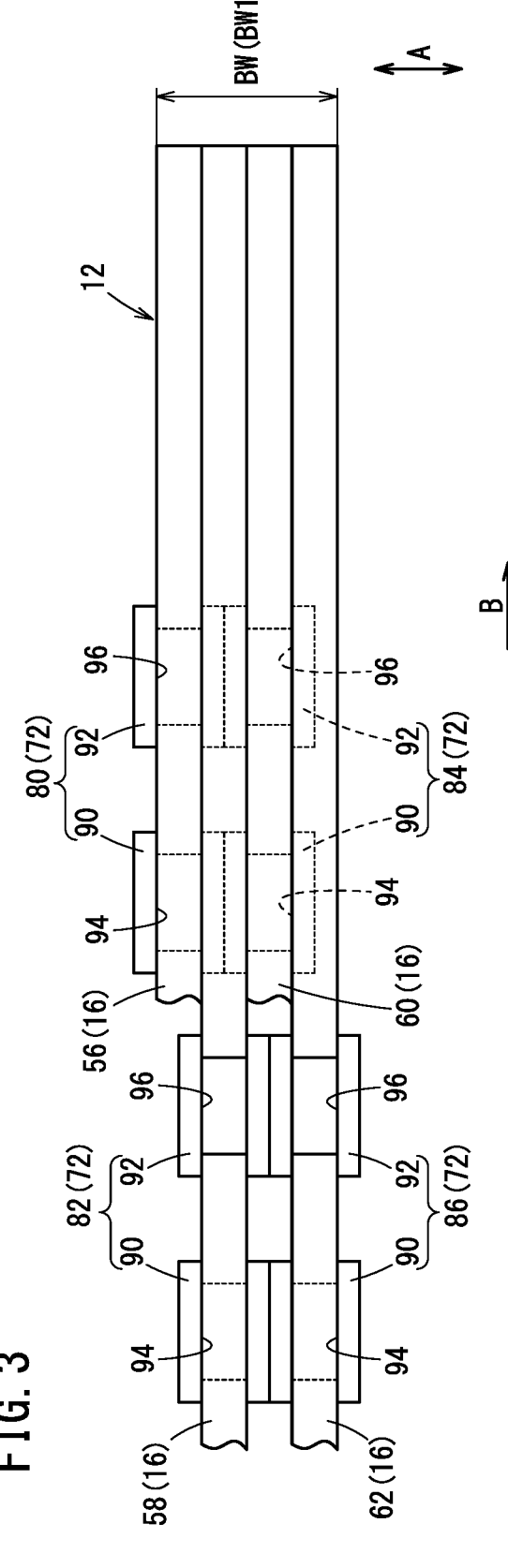
FIG. 3 is a plan view of a plurality of width adjustment rollers.

FIG. 3 is a plan view of the first width adjustment roller 80 to the fourth width adjustment roller 86. In FIG. 3, the plurality of assembly rollers 74 are not shown. In FIG. 3, for convenience of explanation, the first width adjustment roller 80 to the fourth width adjustment roller 86 are shown with their positions shifted in the direction of arrow B and the vertical direction as compared with FIG. 1.

In FIG. 3, the first roller 90 and the second roller 92 are disposed along the direction of arrow B for each of the first width adjustment roller 80 to the fourth width adjustment roller 86. That is, the first roller 90 and the second roller 92 are not offset in the direction of arrow A. Therefore, the width of the first guide groove 94 and the width of the second guide groove 96 are the width of each of the fiber bundles 16. Each of the fiber bundles 16 is disposed adjacently on the downstream side in the direction of arrow B with respect to the first width adjustment roller 80 to the fourth width adjustment roller 86. In the example of FIG. 3, a width BW of the band-shaped bundle 12 is BW1.

Figure 4:
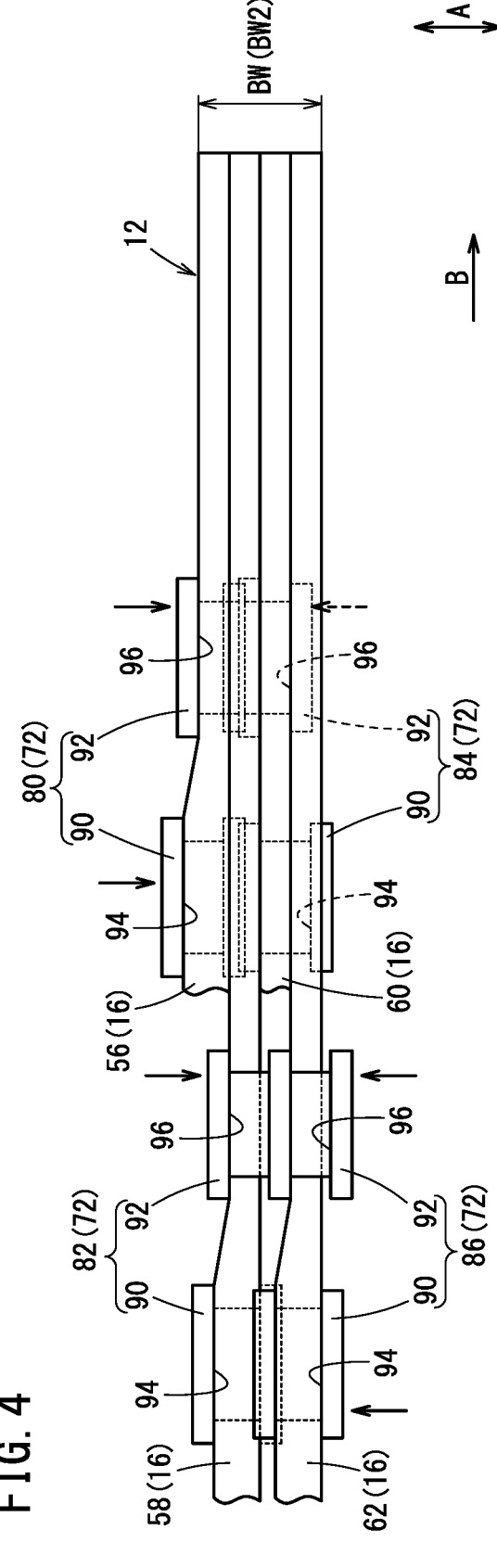
FIG. 4 is a plan view of the plurality of width adjustment rollers.

FIG. 4 is a plan view illustrating a case where the width BW of the band-shaped bundle 12 is changed. In FIG. 4, the first roller 90 and the second roller 92 are relatively offset in the direction of arrow A with respect to each of the first width adjustment roller 80 to the fourth width adjustment roller 86. As a result, the fiber bundles 16 are pressed and deformed in the direction of arrow A. As a result, the width of each of the fiber bundles 16 is adjusted.

In FIG. 4, as indicated by the arrows, at least one of the first roller 90 or the second roller 92 is displaced in the direction of arrow A for each of the first width adjustment roller 80 to the fourth width adjustment roller 86. As a result, the respective fiber bundles 16 are pressed in the direction of arrow A, and the width of each fiber bundle 16 is smaller than that in FIG. 3. That is, the width obtained by subtracting the offset amount of at least one roller from the width of each of the first guide groove 94 and the second guide groove 96 becomes the width of the fiber bundle 16 after the adjustment. By adjusting the width of each of the fiber bundles 16 in this manner, the width BW of the band-shaped bundle 12 formed by arranging the fiber bundles 16 in a row in the direction of arrow A can be adjusted. In FIG. 4, the width BW of the band-shaped bundle 12 is adjusted from BW1 to BW2 (BW1>BW2), as compared with FIG. 3.

As shown in FIG. 1, the plurality of assembly rollers 74 are disposed between the plurality of width adjustment rollers 72 and the workpiece 14. The plurality of assembly rollers 74 rotate while contacting the plurality of fiber bundles 16 after passing through the plurality of width adjustment rollers 72, thereby forming the plurality of fiber bundles 16 as the band-shaped bundle 12.

Specifically, the plurality of assembly rollers 74 include a first assembly roller 110 and a second assembly roller 112. The first assembly roller 110 and the second assembly roller 112 are arranged in order in the direction of arrow B with a space therebetween. Each of the first assembly roller 110 and the second assembly roller 112 extends in the direction of arrow A.

The plurality of fiber bundles 16 are passed over the upper portion of the outer peripheral surface of the first assembly roller 110. The plurality of fiber bundles 16 are passed on the lower portion of the outer peripheral surface of the second assembly roller 112. As shown in FIG. 1, the first fiber bundle 56 to the fourth fiber bundle 62 are sequentially put over each of the first assembly roller 110 and the second assembly roller 112 in the direction of arrow A. The first assembly roller 110 and the second assembly roller 112 form one band-shaped bundle 12 by extending the first fiber bundle 56 to the fourth fiber bundle 62 so as to be adjacent to each other in the direction of arrow A.

The liner support unit 34 supports the liner 18 which is the workpiece 14. The liner support unit 34 has a base 114, a first support post 116, a second support post 118, a first support shaft portion 120, and a second support shaft portion 122. The base 114 has a plate shape. The first support post 116 and the second support post 118 are vertically provided on the base 114 with a space therebetween in the direction of arrow A. The first support shaft portion 120 extends from the first support post 116 toward the second support post 118. The first support shaft portion 120 is inserted into one of the caps 28 (see FIG. 2) of the liner 18. The second support shaft portion 122 extends from the second support post 118 toward the first support post 116, coaxially with the first support shaft portion 120. The second support shaft portion 122 is inserted into another cap 28 of the liner 18. Accordingly, the first support shaft portion 120 and the second support shaft portion 122 are disposed coaxially with the axis 24 of the liner 18.

A rotation drive unit 124 such as a motor is connected to the first support shaft portion 120. The rotation drive unit 124 rotates the first support shaft portion 120 in order to rotate the workpiece 14 about the axis 24 of the liner 18. The band-shaped bundle 12 can be wound on the surface of the liner 18 by advancing the band-shaped bundle 12 from the delivery head 32 while rotating the workpiece 14 and moving the delivery head 32 in the direction of arrow A and to the upstream side and downstream side in the direction of arrow B.

The FW device 10 further includes a computer 129. The computer 129 has a control unit 130 that is a processor. The control unit 130 may be configured by a processor such as a central processing unit (CPU) or a graphics processing unit (GPU). That is, the control unit 130 may be configured by a processing circuitry.

The control unit 130 has a memory 132 (storage unit). The control unit 130 realizes various functions for controlling the respective units of the FW device 10 by reading out and executing the program stored in the memory 132. Specifically, the control unit 130 realizes the functions of a first offset amount calculation unit 1301, a second offset amount calculation unit 1302, and an outer diameter acquisition unit 1303 by reading and executing the program.

At least a part of the first offset amount calculation unit 1301, the second offset amount calculation unit 1302, or the outer diameter acquisition unit 1303 may be realized by an integrated circuit such as an application specific integrated circuit (ASIC) or a field-programmable gate array (FPGA). At least a part of the first offset amount calculation unit 1301, the second offset amount calculation unit 1302, or the outer diameter acquisition unit 1303 may be constituted by an electronic circuit including a discrete device.

The memory 132 may be configured by a volatile memory (not shown) and a non-volatile memory (not shown). As the volatile memory, there may be cited, for example, a random access memory (RAM). The volatile memory is used as a working memory of the processor, and temporarily stores data or the like necessary for processing or calculations. As the non-volatile memory, there may be cited, for example, a read only memory (ROM), a flash memory, or the like. The non-volatile memory is used as a storage memory, and stores therein programs, tables 134, maps, and the like. At least a portion of the memory 132 may be provided in the processor, the integrated circuit, or the like, which were described above.

The control unit 130 controls the rotation drive unit 124 in order to rotate the workpiece 14. The control unit 130 controls the plurality of bobbin drive units 38 in order to rotate the plurality of bobbins 36. The control unit 130 controls the plurality of roller movement units 102 to offset at least one of the first roller 90 or the second roller 92 in the direction of arrow A.

The first offset amount calculation unit 1301 of the control unit 130 calculates an offset amount (first offset amount) of the width adjustment roller 72 in the direction of arrow A for each of the plurality of width adjustment rollers 72. The control unit 130 controls the plurality of roller movement units 102 based on the calculated offset amount, thereby offsetting the width adjustment roller 72 in the direction of arrow A.

Two methods of calculating the offset amount in the first offset amount calculation unit 1301 will be described below.

In a first calculation method, the first offset amount calculation unit 1301 calculates the offset amount of each of the plurality of width adjustment rollers 72 based on an outer diameter D (see FIG. 2) of the workpiece 14 around which the band-shaped bundle 12 is wound, an angle WA between the band-shaped bundle 12 wound around the workpiece 14 and the axis 24 of the liner 18, and a number of turns N of the band-shaped bundle 12 wound around the workpiece 14.

The relationship among the width BW of the band-shaped bundle 12, the width BWx of the band-shaped bundle 12 wound around the workpiece 14 in the circumferential direction of the workpiece 14, and the angle WA is expressed by a following equation (1).

$$BWx = BW / \cos(WA) \tag{1}$$

When the band-shaped bundle 12 is wound adjacently around the workpiece 14, the relationship among the outer diameter D of the workpiece 14, the width BW of the band-shaped bundle 12, and the number of turns N is expressed by following equations (2) and (3). Note that π (pi) is the circle ratio. Further, π×D is the outer circumference (circumferential length) of the workpiece 14.

$$\pi \times D = \{BW / \cos(WA)\} \times N \tag{2}$$

$$BW = (\pi \times D \times \cos(WA)) / N \tag{3}$$

When π×D>{BW/cos (WA)}×N, if the band-shaped bundle 12 is wound around the workpiece 14, a gap is generated between adjacent parts of the band-shaped bundle 12. When π×D<{BW/cos (WA)}×N, if the band-shaped bundle 12 is wound around the workpiece 14, adjacent parts of the band-shaped bundle 12 are overlapped.

The control unit 130 controls the rotation drive unit 124 according to a predetermined program to wind the band-shaped bundle 12 around the workpiece 14 while rotating the workpiece 14. Therefore, the first offset amount calculation unit 1301 can previously grasp the outer diameter D of the workpiece 14, the angle WA, and the number of turns N of the band-shaped bundle 12.

Specifically, the band-shaped bundle 12 is wound around the workpiece 14, whereby the fiber reinforced resin layer 19 in which the band-shaped bundle 12 is layered is formed on the surface of the workpiece 14. A table 134 is included in the memory 132 of the control unit 130. The table 134 stores the outer diameter D, angle WA, and number of turns N of the workpiece 14 for each layer of the fiber reinforced resin layers 19. The first offset amount calculation unit 1301 calculates the width BW of the band-shaped bundle 12 from the equation (3) using the outer diameter D, the angle WA, and the number of turns N stored in the table 134 for each of the fiber reinforced resin layers 19. The first offset amount calculation unit 1301 calculates the width of each of the fiber bundles 16 from the calculated width BW, and calculates the first offset amount for each of the plurality of width adjustment rollers 72 based on the calculated width of each of the fiber bundles 16.

In the second calculation method, the outer diameter acquisition unit 1303 of the control unit 130 acquires the outer diameter D of the workpiece 14 for each layer of the fiber reinforced resin layers 19 when the band-shaped bundle 12 is wound around the workpiece 14. As described above, the control unit 130 causes the band-shaped bundle 12 to be wound around the workpiece 14 according to a predetermined program. Therefore, the outer diameter acquisition unit 1303 can specify (acquire) the outer diameter D of the workpiece 14 at certain elapsed time by counting the elapsed time from the start time of winding the band-shaped bundle 12 around the workpiece 14. In this case, the first offset amount calculation unit 1301 calculates the width BW of the band-shaped bundle 12 from the equation (3) using the obtained outer diameter D, angle WA and number of turns N stored in the table 134 for each of the fiber reinforced resin layers 19. Therefore, the first offset amount calculation unit 1301 can calculate the width of each of the fiber bundles 16 from the calculated width BW, and calculate the first offset amount for each of the plurality of width adjustment rollers 72 based on the calculated width of each of the fiber bundles 16.

Figure 5:
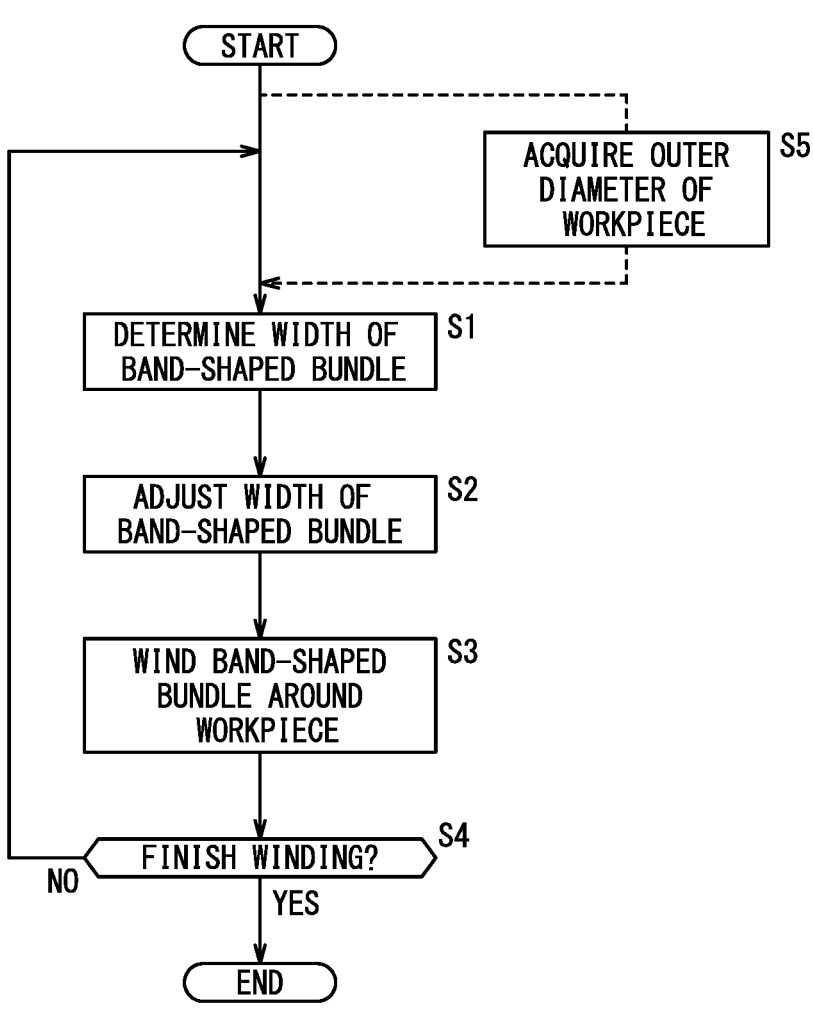
FIG. 5 is a flowchart showing the operation of the FW device.

FIG. 5 is a flowchart showing the operation (filament winding method) of the FW device 10.

When the band-shaped bundle 12 is wound around the workpiece 14, as shown in FIG. 1, the liner 18 is supported by the liner support unit 34, and the fiber bundle delivery unit 30 and the delivery head 32 are disposed on the upstream side in the direction of arrow B with respect to the workpiece 14. Next, the plurality of fiber bundles 16 are drawn out from the plurality of bobbins 36, and the plurality of drawn-out fiber bundles 16 are passed over the plurality of width adjustment rollers 72 and the plurality of assembly rollers 74. In this case, the plurality of fiber bundles 16 are arranged in a row in the direction of arrow B on the plurality of assembly rollers 74, whereby one band-shaped bundle 12 is formed. Next, the starting end of one band-shaped bundle 12 is fixed to the surface of the workpiece 14.

Then, in step S1 (second step) of FIG. 5, the first offset amount calculation unit 1301 of the control unit 130 determines the width BW of the band-shaped bundle 12 based on the outer diameter D, the number of turns N, and the angle WA stored in the table 134 using the above-mentioned Equation (3).

In the next step S2 (third step), the first offset amount calculation unit 1301 calculates the width of each of the fiber bundle 16 from the calculated width BW of the band-shaped bundle 12. The first offset amount calculation unit 1301 calculates the offset amounts of the plurality of width adjustment rollers 72 based on the calculated widths of each of the fiber bundles 16. The control unit 130 controls the plurality of roller movement units 102 based on the calculated offset amounts. Thus, each of the plurality of roller movement units 102 moves at least one of the first roller 90 or the second roller 92 in the direction of arrow A under the control of the control unit 130. As a result, the width of the plurality of fiber bundles 16 is adjusted, and the width BW of the band-shaped bundle 12 constituted by the plurality of fiber bundles 16 can be adjusted.

In next step S3 (first step), the control unit 130 drives the rotation drive unit 124 to rotate the workpiece 14. The control unit 130 drives the plurality of bobbin drive units 38 to rotate the plurality of bobbins 36, thereby conveying the fiber bundles 16 to the delivery head 32. In this way, the winding of the band-shaped bundle 12 around the surface of the workpiece 14 is started.

In step S4, the control unit 130 determines whether or not to finish the winding of the band-shaped bundle 12 around the workpiece 14.

When the winding of the band-shaped bundle 12 around the workpiece 14 is continued (step $4: NO), the control unit 130 returns to step S1 and executes the processing of steps S1 to S4 again. By repeatedly executing the processing of steps $1 to S4, the width BW of the band-shaped bundle 12 can be adjusted each time the band-shaped bundle 12 is wound around the workpiece 14. As a result, the band-shaped bundle 12 can be wound adjacently around the workpiece 14.

When the winding of the band-shaped bundle 12 around the workpiece 14 is completed (YES in step S4), the control unit 130 stops the driving of the rotation drive unit 124 and the plurality of bobbin drive units 38. By taking out the workpiece 14 from the liner support unit 34, a desired product can be obtained.

The FW device 10 may perform the processing of step S5 prior to step $1. In step S5, the outer diameter acquisition unit 1303 acquires the outer diameter D of the workpiece 14. After the outer diameter D is obtained, the first offset amount calculation unit 1301 performs the processing of step S1 to calculate the width BW of the band-shaped bundle 12 based on the outer diameter D, the number of turns N, and the angle WA.

Figure 6A:
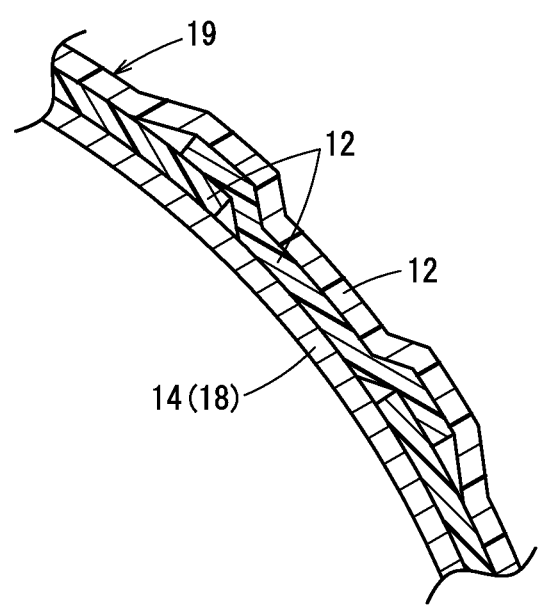
FIG. 6A is a diagram showing a comparative example.

FIG. 6A illustrates a case (comparative example) in which the band-shaped bundle 12 is wound on the surface of the workpiece 14 by a conventional method. In the comparative example, the band-shaped bundle 12 is wound around the workpiece 14 while adjacent parts of the band-shaped bundle 12 are overlapped with each other so that no gap is formed between the adjacent parts of the band-shaped bundle 12 on the surface of the workpiece 14. Since the parts of the band-shaped bundle 12 overlap with each other, the surface of the workpiece 14 becomes uneven. When the band-shaped bundle 12 is further wound on the surface of the workpiece 14, the band-shaped bundle 12 meanders due to the unevenness. Therefore, the conventional technique cannot ensure the mechanical strength of the manufactured product.

Figure 6B:
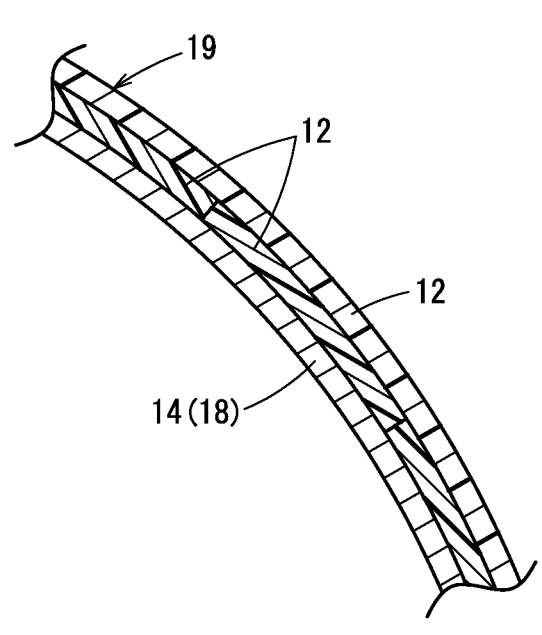
FIG. 6B is a diagram showing an embodiment.

FIG. 6B illustrates a case (embodiment) in which the band-shaped bundle 12 is wound on the surface of the workpiece 14 using the FW device 10 of FIG. 1. In the embodiment, the width BW of the band-shaped bundle 12 is adjusted by using the width adjustment mechanism 100, so that the band-shaped bundle 12 can be wound adjacently around the workpiece 14. This suppresses the occurrence of unevenness on the surface of the workpiece 14. As a result, the band-shaped bundle 12 can be prevented from being wound on the unevenness. Therefore, the mechanical strength of the product, which is a workpiece 14 with the band-shaped bundle 12 being wound therearound, can be improved.

Figure 7:
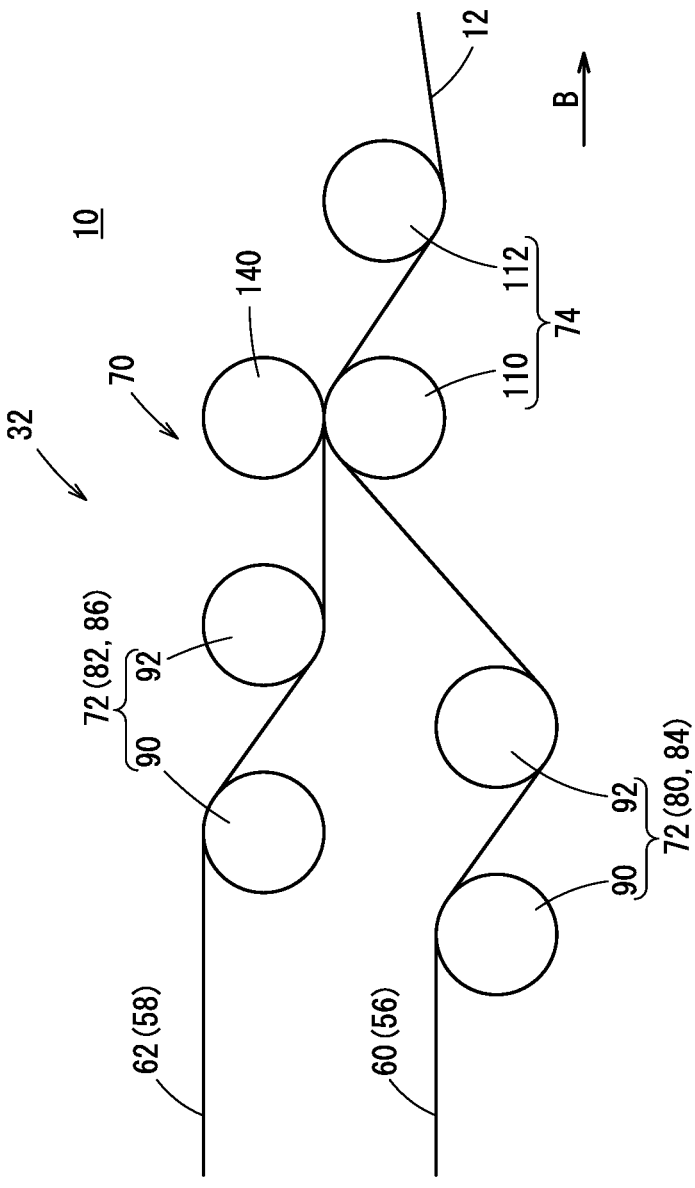
FIG. 7 is a conceptual diagram showing a first exemplary modification.

FIG. 7 is a conceptual diagram showing a first exemplary modification of the FW device 10. In the first exemplary modification, the FW device 10 further includes a nip roller 140. The nip roller 140 works together with the assembly rollers 74 to sandwich and hold the band-shaped bundle 12. FIG. 7 illustrates a case where the band-shaped bundle 12 is sandwiched and held between the nip roller 140 and the first assembly roller 110. In the first exemplary modification, the band-shaped bundle 12 may be sandwiched and held between the nip roller 140 and at least one assembly roller 74 of the first assembly roller 110 or the second assembly roller 112.

Figure 8:
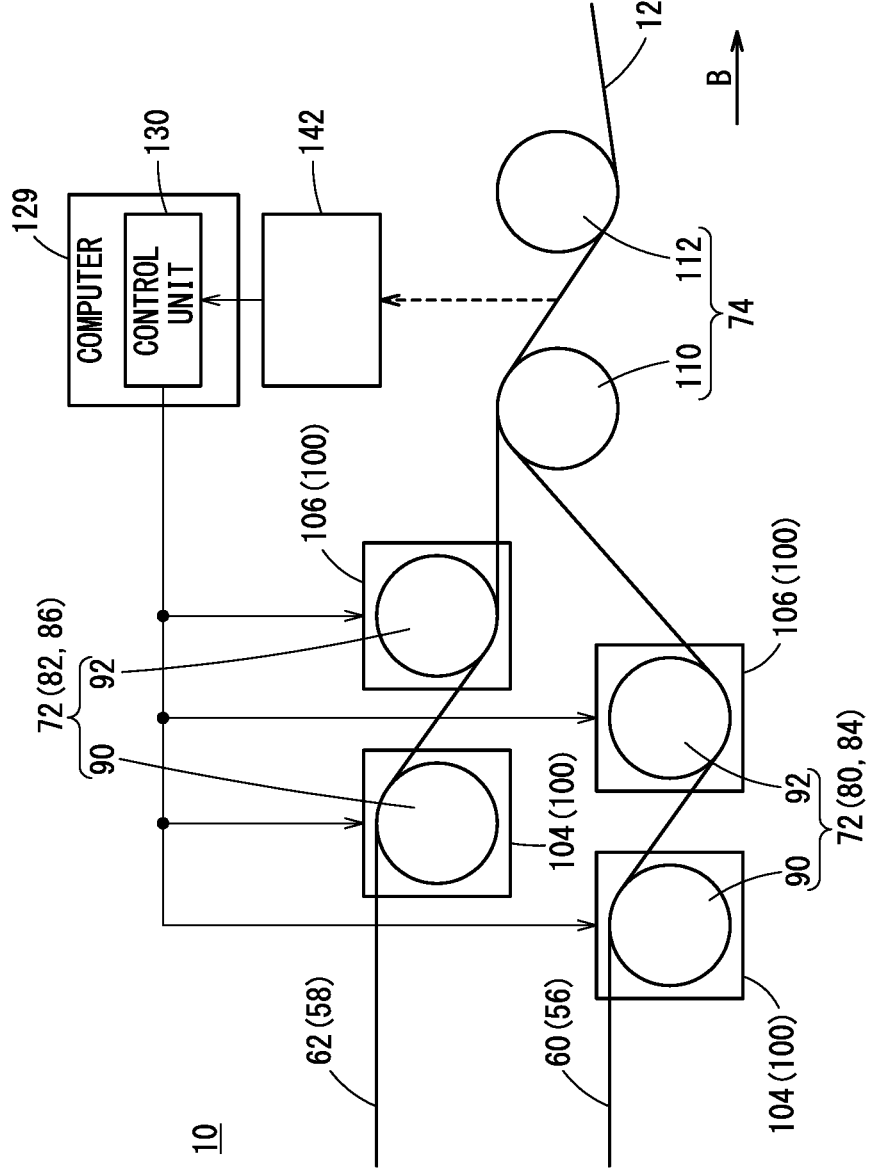
FIG. 8 is a conceptual diagram showing a second exemplary modification.

FIG. 8 is a conceptual diagram showing a second exemplary modification of the FW device 10. In the second exemplary modification, the FW device 10 further includes a width measurement unit 142. The width measurement unit 142 is disposed between the plurality of assembly rollers 74 and the workpiece 14 (see FIG. 1). The width measurement unit 142 is a width measurement sensor using a laser or the like. The width measurement unit 142 sequentially measures the width BW of the band-shaped bundle 12 supplied from the plurality of assembly rollers 74 to the workpiece 14. The width measurement unit 142 sequentially outputs the measurement result of the width BW of the band-shaped bundle 12 to the control unit 130. The second offset amount calculation unit 1302 (see FIG. 1) of the control unit 130 calculates an offset amount (second offset amount) in the direction of arrow B for each of the plurality of width adjustment rollers 72 based on the width BW of the band-shaped bundle 12 measured by the width measurement unit 142. The control unit 130 controls the plurality of roller movement units 102 based on the calculated offset amount, thereby offsetting the plurality of width adjustment rollers 72 in the direction of arrow B.

With respect to the above disclosure, the following appendices are disclosed.

Appendix 1

The filament winding device (10) is configured to wind the band-shaped bundle (12), which is the bundle of the plurality of fibers, around the workpiece (14). The filament winding device includes the roller row (70) configured to convey the band-shaped bundle to the workpiece, and the width adjustment mechanism (100) configured to adjust the width (BW) of the band-shaped bundle during conveyance by the roller row in the manner so that the band-shaped bundle is wound around the workpiece adjacently in the widthwise direction (A) of the band-shaped bundle.

According to the present invention, by adjusting the width of the band-shaped bundle, the band-shaped bundle can be wound adjacently around the workpiece. This suppresses the occurrence of unevenness on the surface of the workpiece, and prevents the band-shaped bundle from being wound on the unevenness. As a result, the mechanical strength of the product, which is a workpiece wound with the band-shaped bundle, can be improved.

Appendix 2

In the filament winding device according to Appendix 1, the band-shaped bundle may be configured by arranging the plurality of fiber bundles (16), each of which is the bundle of the plurality of fibers, in the widthwise direction, the width adjustment mechanism may include the plurality of width adjustment rollers (72) over which the plurality of fiber bundles pass, respectively, the plurality of width adjustment rollers may respectively adjust widths of the fiber bundles to adjust the width of the band-shaped bundles.

Since the width of the band-shaped bundle is easily adjusted by adjusting the widths of the plurality of fiber bundles, the band-shaped bundle can be wound adjacently around the workpiece.

Appendix 3

In the filament winding device according to Appendix 2, the plurality of width adjustment rollers may include the first roller (90) including the first guide groove (94) having an annular shape on the outer peripheral portion of the first roller, the second roller (92) disposed on the downstream side of the first roller in the conveyance direction of the fiber bundle and including the second guide groove (96) having an annular shape on the outer peripheral portion of the second roller, and each of the plurality of fiber bundles may be passed over the first guide groove and the second guide groove of each of the plurality of width adjustment rollers, the width adjustment mechanism may include the plurality of roller movement units (102) each configured to move at least one of the first roller or the second roller of each of the plurality of width adjustment rollers in the axial direction of the first roller or the second roller, and the widths of the plurality of fiber bundles may be adjusted by moving at least one of the first roller or the second roller in the axial direction with respect to each of the plurality of width adjustment rollers by the plurality of roller movement units.

For each of the plurality of fiber bundles, the width of the fiber bundle can be adjusted by moving at least one of the plurality of width adjustment rollers in the axial direction during conveyance of the fiber bundles in the conveyance direction, and pressing and deforming the fiber bundles in the widthwise direction.

Appendix 4

In the filament winding device according to Appendix 3, the filament winding device may further include the rotation drive unit (124) configured to rotate the workpiece having a cylindrical shape about the central axis (24) of the workpiece, and the first offset amount calculation unit (1301) configured to calculate the first offset amount in the axial direction (A) of the width adjustment rollers, which is the widthwise direction, for each of the width adjustment rollers, wherein the first offset amount calculation unit may calculate the first offset amount for each of the plurality of width adjustment rollers, based on the outer diameter (D) of the workpiece around which the band-shaped bundle is wound, the angle (WA) formed by the band-shaped bundle wound around the workpiece and the central axis, and the number of turns (N) of the band-shaped bundle wound around the workpiece, and each of the plurality of roller movement units may offset at least one of the first roller or the second roller in the axial direction based on the calculated first offset amount calculated by the first offset amount calculation unit.

Since the offset amount of each of the width adjustment rollers can be calculated with high accuracy, the widths of the fiber bundles can be adjusted with high accuracy. This makes it possible to adjust the width of the band-shaped bundle with high accuracy.

Appendix 5

In the filament winding device according to Appendix 4, by winding the band-shaped bundle around the workpiece, the fiber layer (19) in which the band-shaped bundle is layered may be formed on the surface of the workpiece, the filament winding device may further include the storage unit (132) configured to store the outer diameter, the angle, and the number of turns of each of the fiber layers, and the first offset amount calculation unit may calculate the first offset amount for each of the plurality of width adjustment rollers using the outer diameter, the angle, and the number of turns stored in the storage unit for each of the fiber layers.

Since the outer diameter, angle and number of turns of each of the fiber layers are stored in advance in the storage unit as design values, the first offset amount can be calculated with a simple configuration.

Appendix 6

In the filament winding device according to Appendix 4, by winding the band-shaped bundle around the workpiece, the fiber layer in which the band-shaped bundle is layered may be formed on the surface of the workpiece, the filament winding device may further include the storage unit configured to store the angle and the number of turns of each of the fiber layers, and the outer diameter acquisition unit (1303) configured to acquire the outer diameter of each of the fiber layers when the band-shaped bundle is wound around the workpiece, and the first offset amount calculation unit may calculate the first offset amount for each of the plurality of width adjustment rollers using the outer diameter acquired by the outer diameter acquisition unit, and the angle and the number of turns stored in the storage unit, for each of the fiber layers.

By acquiring the outer diameter of the workpiece when the band-shaped bundle is wound around the workpiece, the first offset amount can be calculated with high accuracy using the acquired outer diameter, and the angle and the number of turns stored in the storage unit.

Appendix 7

In the filament winding device according to any of Appendices 3 to 6, the filament winding device may further include the assembly roller (74) disposed between the plurality of width adjustment rollers and the workpiece, and configured to rotate while contacting the plurality of fiber bundles after passing through the plurality of width adjustment rollers to form the plurality of fiber bundles into the band-shaped bundle.

By using the assembly roller, it is possible to gather a plurality of fiber widths having adjusted widths into a width of one band-shaped bundle. This makes it possible to wind the band-shaped bundle, the width of which is adjusted, around the workpiece.

Appendix 8

In the filament winding device according to Appendix 7, the filament winding device may further include the nip roller (140) configured to work together with the assembly roller to sandwich and hold the band-shaped bundle.

The band-shaped bundle is sandwiched and held between the nip roller and the assembly roller, whereby the thickness of the band-shaped bundle can be made uniform.

Appendix 9

In the filament winding device according to Appendix 7 or 8, the filament winding device may further include the width measurement unit (142) disposed between the assembly roller and the workpiece, and configured to measure the width of the band-shaped bundle, and the second offset amount calculation unit (1302) configured to calculate the second offset amount in the axial direction for each of the plurality of width adjustment rollers based on the width of the band-shaped bundle measured by the width measurement unit, and each of the plurality of roller movement units may offset the width adjustment rollers in the widthwise direction based on the second offset amount calculated by the second offset amount calculation unit.

The width of the band-shaped bundle is measured by in-line measurement, and the second offset amount can be calculated with high accuracy based on the measured width. This makes it possible to adjust the width of the fiber bundle with high accuracy. As a result, the width of the band-shaped bundle can be adjusted with high accuracy.

Appendix 10

In the filament winding device according to any of Appendices 1 to 9, the workpiece may include a cylinder portion (20) having a round tubular shape and dome portions (22) provided at both ends of the cylinder portion, and the helical layer may be formed on the surface of the workpiece by winding the band-shaped bundle adjacently on surfaces of the two dome portions by way of helical winding, so as to be provided on the surface of the cylinder portion, and the hoop layer may be formed on the surface of the portion of the helical layer that is formed on the cylinder portion, by winding the band-shaped bundle by way of hoop winding.

Since the band-shaped bundle is wound adjacently by way of helical winding, no unevenness is generated on the surface of the helical layer. Thus, even when the hoop layer is formed on the surface of the helical layer, no unevenness is generated in the hoop layer. As a result, the mechanical strength of the product can be further improved.

Appendix 11

The filament winding method of winding the band-shaped bundle, which is the bundle of the plurality of fibers, around the workpiece, is provided. The filament winding method includes conveying the band-shaped bundle to the workpiece by the roller row, as the first step (S3), adjusting the width of the band-shaped bundle during conveyance of the band-shaped bundle by the roller row, as the second step (S2), and winding the band-shaped bundle around the workpiece adjacently in the widthwise direction of the band-shaped bundle, as the third step (S3).

According to the present invention, by adjusting the width of the band-shaped bundle, the band-shaped bundle can be wound adjacently around the workpiece. This suppresses the occurrence of unevenness on the surface of the workpiece, and prevents the band-shaped bundle from being wound on the unevenness. As a result, the mechanical strength of the product, which is a workpiece wound with the band-shaped bundle, can be improved.

It should be noted that the present invention is not limited to the disclosure described above, and various alternative or additional configurations could be adopted therein without departing from the essence and gist of the present invention.

The invention claimed is:

1. A filament winding device configured to wind a band shaped bundle around a workpiece, comprising:
   a roller row configured to convey the band-shaped bundle to the workpiece; and
   a width adjustment mechanism configured to adjust a width of the band-shaped bundle during conveyance by the roller row in a manner so that the band-shaped bundle is wound around the workpiece adjacently in a widthwise direction of the band-shaped bundle,
   wherein the band-shaped bundle is configured by arranging a plurality of fiber bundles, each of which is a bundle of a plurality of fibers, in the widthwise direction,
   the width adjustment mechanism includes a plurality of width adjustment rollers over which the plurality of fiber bundles pass, respectively,
   the plurality of width adjustment rollers respectively adjust widths of the fiber bundles to adjust the width of the band-shaped bundles, and
   wherein each of the plurality of width adjustment rollers includes:
   a first roller including a first guide groove having an annular shape on an outer peripheral portion of the first roller; and
   a second roller disposed on a downstream side of the first roller in a conveyance direction of the fiber bundle and including a second guide groove having an annular shape on an outer peripheral portion of the second roller, and
   wherein each of the plurality of fiber bundles is passed over the first guide groove and the second guide groove of each of the plurality of width adjustment rollers.

2. The filament winding device according to claim 1, wherein
   the width adjustment mechanism includes a plurality of roller movement units each configured to move at least one of the first roller or the second roller of each of the plurality of width adjustment rollers in an axial direction of the first roller or the second roller, and
   the widths of the plurality of fiber bundles are adjusted by moving at least one of the first roller or the second roller in the axial direction with respect to each of the plurality of width adjustment rollers by the plurality of roller movement units.

3. The filament winding device according to claim 2, further comprising:

a rotation drive unit configured to rotate the workpiece having a cylindrical shape about a central axis of the workpiece; and a computer including a storage unit and one or more processors, wherein the storage unit stores instructions executable by the computer, the one or more processors execute the instructions executable by the computer to calculate a first offset amount in the axial direction of the width adjustment rollers, which is the widthwise direction, for each of the plurality of width adjustment rollers, based on an outer diameter of the workpiece around which the band-shaped bundle is wound, an angle formed by the band-shaped bundle wound around the workpiece and the central axis, and a number of turns of the band-shaped bundle wound around the workpiece, and each of the plurality of roller movement units offsets at least one of the first roller or the second roller in the axial direction based on a calculated first offset amount.

4. The filament winding device according to claim 3, wherein by winding the band-shaped bundle around the workpiece, a fiber layer in which the band-shaped bundle is layered is formed on a surface of the workpiece, the storage unit stores the outer diameter, the angle, and the number of turns of each of the fiber layers, and the one or more processors calculate the first offset amount for each of the plurality of width adjustment rollers using the outer diameter, the angle, and the number of turns stored in the storage unit, for each of the fiber layers.

5. The filament winding device according to claim 3, wherein by winding the band-shaped bundle around the workpiece, a fiber layer in which the band-shaped bundle is layered is formed on a surface of the workpiece, the storage unit stores the angle and the number of turns of each of the fiber layers, the one or more processors are configured to:

acquire the outer diameter of each of the fiber layers when the band-shaped bundle is wound around the workpiece; and calculate the first offset amount for each of the plurality of width adjustment rollers using an acquired outer diameter, and the angle and the number of turns stored in the storage unit, for each of the fiber layers.

6. The filament winding device according to claim 2, further comprising an assembly roller disposed between the plurality of width adjustment rollers and the workpiece, and configured to rotate while contacting the plurality of fiber bundles after passing through the plurality of width adjustment rollers to form the plurality of fiber bundles into the band shaped bundle.

7. The filament winding device according to claim 6, further comprising a nip roller configured to work together with the assembly roller to sandwich and hold the band-shaped bundle.

8. The filament winding device according to claim 6, further comprising:

a width measurement unit disposed between the assembly roller and the workpiece, and configured to measure the width of the band-shaped bundle; and a computer including a storage unit and one or more processors, wherein the storage unit stores instructions executable by the computer, the one or more processors execute the instructions executable by the computer to calculate a second offset amount in the axial direction for each of the plurality of width adjustment rollers based on the width of the band-shaped bundle measured by the width measurement unit, and each of the plurality of roller movement units offsets the width adjustment rollers in the widthwise direction based on a calculated second offset amount.

9. The filament winding device according to claim 1, wherein the workpiece includes a cylinder portion having a round tubular shape and dome portions provided at both ends of the cylinder portion, and a helical layer is formed on a surface of the workpiece by winding the band-shaped bundle adjacently on surfaces of the two dome portions by way of helical winding, so as to be provided on the surface of the cylinder portion, and a hoop layer is formed on a surface of a portion of the helical layer that is formed on the cylinder portion, by winding the band-shaped bundle by way of hoop winding.

10. A filament winding method of winding a band-shaped bundle around a workpiece using the filament winding device according to claim 1, the method comprising:

conveying the band-shaped bundle to the workpiece by a roller row, as a first step;

adjusting a width of the band-shaped bundle during conveyance of the band-shaped bundle by the roller row, as a second step; and winding the band-shaped bundle around the workpiece adjacently in a widthwise direction of the band-shaped bundle, as a third step.

* * * * *